(12) United States Patent
Takatsuka et al.

(10) Patent No.: US 9,148,586 B2
(45) Date of Patent: Sep. 29, 2015

(54) TERMINAL APPARATUS FOR COMBINING IMAGES FROM TWO DIFFERENT CAMERAS BASED ON DETECTED SOUND

(71) Applicant: SONY MOBILE COMMUNICATIONS INC., Minato-ku (JP)

(72) Inventors: Susumu Takatsuka, Tokyo (JP); Yuji Matsumoto, Tokyo (JP); Shin Takanashi, Tokyo (JP); Yuji Ide, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 136 days.

(21) Appl. No.: 13/754,504

(22) Filed: Jan. 30, 2013

(65) Prior Publication Data
US 2013/0208136 A1  Aug. 15, 2013

Related U.S. Application Data

(60) Provisional application No. 61/597,389, filed on Feb. 10, 2012.

(51) Int. Cl.
*H04N 5/262* (2006.01)
*H04N 5/232* (2006.01)
*H04N 5/225* (2006.01)

(52) U.S. Cl.
CPC ............ *H04N 5/2621* (2013.01); *H04N 5/2258* (2013.01); *H04N 5/23219* (2013.01); *H04N 5/23293* (2013.01); *H04N 5/23245* (2013.01)

(58) Field of Classification Search
CPC ............ H04N 5/23277; H04N 5/3415; H04N 5/3692; H04N 21/42203; H04N 5/2251; H04N 5/272; H04N 5/2621; H04N 5/23219; H04N 5/2258; H04N 5/23245; H04N 2201/0015; H04N 2101/00; H04N 1/00307; H04N 7/185
USPC ................................ 348/333.05, 211.99, 239
See application file for complete search history.

(56) References Cited

U.S. PATENT DOCUMENTS 6,714,660 B1   3/2004  Ohba
7,697,827 B2 *  4/2010  Konicek .......................... 396/56

(Continued)

FOREIGN PATENT DOCUMENTS

EP  0 999 518 A1  5/2000
JP  2010-161655  7/2010

OTHER PUBLICATIONS

Extended Search Report issued Jun. 24, 2013 in European Application No. 13154570.9.

*Primary Examiner* — Pritham Prabhakher
(74) *Attorney, Agent, or Firm* — Oblon, McClelland, Maier & Neustadt, L.L.P.

(57) ABSTRACT

A terminal apparatus including a display unit disposed on a case and is configured to display an image; a first camera disposed on a surface on which the display unit performs image display; a second camera disposed on a surface opposite the surface on which the first camera is disposed; a plurality of microphones disposed on the case; a sound processing unit that detects sound transmitted from a sound source on a side of the first camera with sound signals obtained by at least one of the plurality of microphones; and an image processing unit that combines a first image which is captured by the first camera or is stored in advance with a second image captured by the second camera on the basis of a result of the detection of sound transmitted from the sound source on the side of the first camera.

8 Claims, 10 Drawing Sheets

(56) References Cited

U.S. PATENT DOCUMENTS

| | | |
|---|---|---|
| 8,107,771 B2 * | 1/2012 | Sako et al. .................... 382/298 |
| 8,570,397 B2 * | 10/2013 | Jeong et al. ................ 348/231.1 |
| 8,610,812 B2 * | 12/2013 | Kim ........................ 348/333.12 |
| 2004/0240740 A1 | 12/2004 | Ohba |
| 2006/0017832 A1 | 1/2006 | Kemppinen |
| 2007/0086764 A1 | 4/2007 | Konicek |
| 2007/0110279 A1 | 5/2007 | Ohba |
| 2007/0292048 A1 * | 12/2007 | Choe et al. .................... 382/286 |
| 2009/0016645 A1 | 1/2009 | Sako et al. |
| 2010/0123793 A1 | 5/2010 | Yamamoto |
| 2010/0166399 A1 | 7/2010 | Konicek |
| 2010/0332229 A1 * | 12/2010 | Aoyama et al. ............... 704/251 |
| 2011/0228098 A1 * | 9/2011 | Lamb et al. .................... 348/164 |
| 2012/0113281 A1 * | 5/2012 | Kim ........................... 348/220.1 |
| 2012/0147204 A1 * | 6/2012 | Jeong et al. .............. 348/211.11 |
| 2012/0287218 A1 * | 11/2012 | Ok ............................. 348/14.02 |

* cited by examiner

MIXED SOUND

OUTSIDE SOUND

INSIDE SOUND

PHOTOGRAPHER

IMAGE

DISPLAY SCREEN FOR
AVATAR SELECTION

ONLY OUTSIDE IMAGE

SIMULTANEOUS DISPLAY EXAMPLE

TERMINAL APPARATUS FOR COMBINING IMAGES FROM TWO DIFFERENT CAMERAS BASED ON DETECTED SOUND

CROSS REFERENCE TO RELATED APPLICATIONS

This application is related to and claims priority under 35 U.S.C. §119(e) to Provisional Application Ser. No. 61/597,389, filed Feb. 10, 2012, the contents of which are hereby incorporated herein by reference.

BACKGROUND

1. Field

The present disclosure relates to a terminal device suitable for use as a camera-equipped mobile telephone and an image capturing method suitable for use in a camera-equipped mobile telephone.

2. Description of the Related Art

Various mobile telephone terminal devices with a built-in camera have been commercialized. An image captured with a camera function of such a mobile telephone terminal device is stored in a memory included in the mobile telephone terminal device and is displayed by a display unit included in the mobile telephone terminal device. In addition, with a radio communication function of the mobile telephone terminal device, a stored image can be transmitted to a communication partner by e-mail. Alternatively, the mobile telephone terminal device can access an image storage server connected to the Internet and transmit a captured image to the image storage server.

Some of camera-equipped mobile telephone terminal devices have two cameras, a camera (an outside camera) for capturing the image of the outside of the device and a camera (an inside camera) for capturing the image of the inside of the device. In such a mobile telephone terminal device having two cameras, for example, an outside camera is used to capture the image of the scenery around a photographer and an inside camera is used to capture the image of the face of the photographer.

Patent Literature 1 discloses a mobile telephone terminal device having two cameras, an outside camera and an inside camera. Patent Literature 1 discloses a technique for detecting a line of sight of a photographer from a camera image and switching between an image captured by the outside camera and an image captured by the inside camera on the basis of the detected line of sight.

CITATION LIST

Patent Literature

[PTL 1] Japanese Unexamined Patent Application Publication No. 2010-161655

Such a camera-equipped mobile telephone terminal device having two cameras, an outside camera and an inside camera, can respond to various image capturing conditions. However, a mobile telephone terminal device in the related art can only switch between two camera image as disclosed in Patent Literature 1, and it is difficult for it to perform image editing for appropriately synthesizing an image captured by an outside camera and an image captured by an inside camera in accordance with a situation.

An inventor recognizes the necessity to easily perform advanced image editing with images captured by two cameras, an outside camera and an inside camera.

BRIEF SUMMARY

A terminal device according to the present disclosure includes a display unit that is disposed on a case and is configured to display an image, an inside camera disposed on a surface on which the display unit performs image display, an outside camera disposed on a surface opposite the surface on which the inside camera is disposed, a plurality of microphones disposed on the case, a sound processing unit, and an image processing unit.

The sound processing unit detects sound transmitted from a sound source on a side of the inside camera with sound signals obtained by the plurality of microphones. An image processing unit combines an image captured by the inside camera with an image captured by the outside camera on the basis of a result of the detection of sound transmitted from a sound source on the side of the inside camera which has been performed by the sound processing unit.

An image capturing method according to the present disclosure includes acquiring an image captured by an inside camera and an image captured by an outside camera, detecting sound transmitted from a sound source on a side of the inside camera, and performing image processing for starting processing for combining the image captured by the inside camera with the image captured by the outside camera on the basis of a result of the detection of sound transmitted from a sound source on the side of the inside camera.

According to the present disclosure, on the basis of the state of input of sound transmitted from a sound source on the side of an inside camera in a terminal device, processing for adding an image captured by the inside camera to an image captured by an outside camera is started. Accordingly, on the basis of the voice of a photographer carrying the terminal device, image synthesis processing can be started and automatic image editing can be performed.

DETAILED DESCRIPTION

An example of a terminal device according to an embodiment of the present disclosure and an example of an image capturing method according to an embodiment of the present disclosure will be described in the following order with reference to the accompanying drawings:
1. Configuration of Terminal Device (FIGS. 1 and 2),
2. Process at the Time of Image Capturing (FIGS. 3 to 7),
3. Example of Avatar Display Processing (FIG. 8), and
4. Modification (FIGS. 9 to 10).

[1. Configuration of Terminal Device]

FIG. 1 illustrates the outside shape of a terminal device according to an exemplary embodiment of the present disclosure.

A terminal device illustrated in FIG. 1 is a mobile telephone terminal device called smart phone.

Figure 1A:
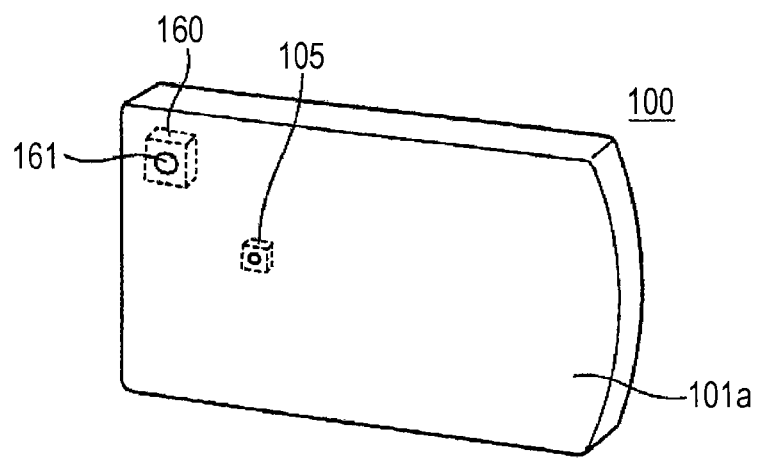
FIG. 1A and FIG. 1B are perspective views illustrating an exemplary shape of a terminal device according to an embodiment of the present disclosure.

A mobile telephone terminal device 100 is in a case made of, for example, a resin. FIG. 1A illustrates an outer surface 101a of the case, and FIG. 1B illustrates an inner surface 101b of the case.

As illustrated in FIG. 1A, on the outer surface 101a of the mobile telephone terminal device 100, a lens 161 of a camera 160 is disposed. The camera 160 captures the image of the outside of the mobile telephone terminal device 100. In addition, on the outer surface 101a of the mobile telephone terminal device 100, a microphone 105 is disposed and collects sound input from the outside of the mobile telephone terminal device 100.

Figure 1B:
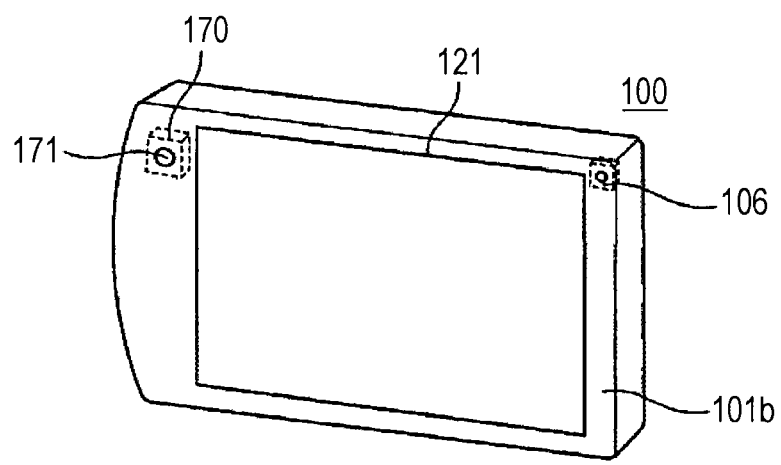

As illustrated in FIG. 1B, on the inner surface 101b of the mobile telephone terminal device 100, a display panel 121 for displaying an image and various pieces of information is disposed. As the display panel 121, a liquid crystal display panel or an organic EL (electroluminescence) display panel is used. A touch panel to be described later is located on the display panel 121.

In addition, on the inner surface 101b of the mobile telephone terminal device 100, a lens 171 of a camera 170 is disposed adjacent to the display panel 121. The camera 170 captures the image of the inside of the mobile telephone terminal device 100. Furthermore, on the inner surface 101b of the mobile telephone terminal device 100, a microphone 106 is disposed and collects sound input from the inside of the mobile telephone terminal device 100. Still furthermore, on the inner surface 101b of the mobile telephone terminal device 100, operation keys 140 are disposed.

In the following description, the camera 160 disposed on the outer surface 101a is referred to as an outside camera and the camera 170 disposed on the inner surface 101b is referred to as an inside camera.

Referring to FIG. 1, a single microphone (each of the microphones 105 and 106) is disposed on the outer surface 101a and the inner surface 101b of the mobile telephone terminal device 100. A plurality of microphones may be disposed on each of the surfaces 101a and 101b.

Figure 2:
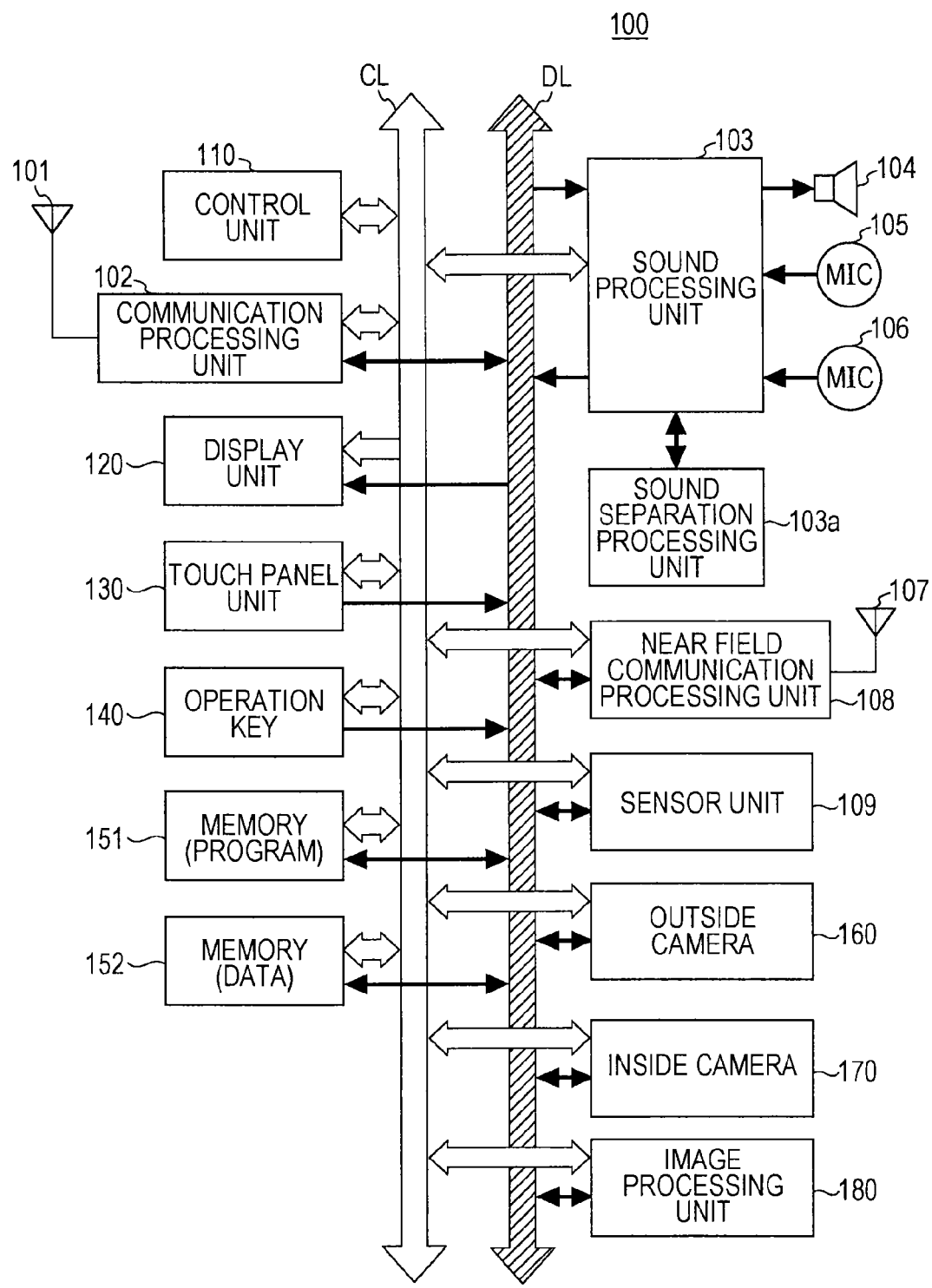
FIG. 2 is a block diagram illustrating an exemplary configuration of a terminal device according to an embodiment of the present disclosure.

Next, the internal configuration of the mobile telephone terminal device 100 will be described with reference to FIG. 2.

The mobile telephone terminal device 100 includes an antenna 101 used for radio communication with a radiophone base station, and the antenna 101 is connected to a communication processing unit 102. The communication processing unit 102 transmits and receives a radio signal under the control of a control unit 110. The control unit 110 transmits a control command to the communication processing unit 102 via a control line CL. The control unit 110 reads out a program (software) stored in a memory 151 via the control line CL and executes the program so as to control each unit in the mobile telephone terminal device 100. The mobile telephone terminal device 100 includes a memory 152 for storing data in addition to the memory 151 that stores a program, and stores and reads out data in and from the memory 152 under the control of the control unit 110. The memory 152 stores various pieces of data such as telephone directory data necessary for communication and e-mail data. The memory 152 further stores data of an image captured by each of the outside camera 160 and the inside camera 170 and data of sound acquired by each of the microphone 105 and 106. The memory 152 still further stores an avatar image to be described later.

At the time of speech communication, in the mobile telephone terminal device 100, sound data for the speech communication is received by the communication processing unit 102, is supplied to a sound processing unit 103 via a data line DL, and is demodulated by the sound processing unit 103. An analog sound signal obtained through the demodulation performed by the sound processing unit 103 is supplied to a speaker 104 and is output from the speaker 104 as sound.

A sound signal output from the microphone 106 is converted into sound data in a transmission format by the sound processing unit 103. The sound data is supplied to the communication processing unit 102 via the data line DL and is then wirelessly transmitted. The sound processing unit 103 is used not only for speech communication but also another case. For example, the sound processing unit 103 processes sound signals supplied from the microphones 105 and 106 at the time of moving image capturing performed with the outside camera 160 or the inside camera 170. In addition, the sound processing unit 103 can perform effect processing for changing sound pitch and sound tempo at the time of processing of a sound signal.

A sound separation processing unit 103a is connected to the sound processing unit 103. The sound separation processing unit 103a analyzes sound input from the two microphones 105 and 106 illustrated in FIG. 1 and separates the sound in accordance with a sound source position. The processing for analyzing sound and separating, from the sound, sound transmitted from a specific sound source position may be performed with any one of various proposed methods. An example of the processing for separating sound transmitted from a specific sound source position from another sound is disclosed in, for example, Japanese Unexamined Patent Application Publication No. 2009-147654.

In a case where data communication and the sending and receiving of an e-mail are performed via a network such as the Internet, the communication processing unit 102 performs sending processing and receiving processing under the control of the control unit 110. For example, data received by the communication processing unit 102 is stored in the memory 152 and is then displayed under the control of the control unit 110. The control unit 110 supplies data stored in the memory 152 to the communication processing unit 102 so as to wirelessly transmit the data.

The mobile telephone terminal device 100 further includes a display unit 120. The display unit 120 displays an image and various pieces of information on the display panel 121 (FIG. 1B) under the control of the control unit 110. When the outside camera 160 or the inside camera 170 captures a moving image or a still image, the display unit 120 displays a captured image.

The mobile telephone terminal device 100 further includes a touch panel unit 130 for detecting a position at which the surface of the display panel 121 has been touched by a finger or pen. Data of the detected position is transmitted to the control unit 110.

The mobile telephone terminal device 100 further includes the operation keys 140. The conditions of operation of the operation keys 140 are supplied to the control unit 110.

The mobile telephone terminal device 100 further includes a near field communication processing unit 108 connected to an antenna 107. The near field communication processing unit 108 performs near field communication with a neighboring terminal device or an access point. The near field communication processing unit 108 performs radio communication with a communication partner within, for example, tens of meters therefrom with a wireless LAN method compliant with the IEEE802.11 standard or a method called Bluetooth (registered trademark).

The mobile telephone terminal device 100 further includes a sensor unit 109. Examples of the sensor unit 109 include a sensor (an acceleration sensor or a terrestrial magnetism sensor) for detecting the movement of a device and a sensor (proximity sensor) for detecting the surroundings of a device.

Each of the outside camera 160 and the inside camera 170 included in the mobile telephone terminal device 100 captures an image under the control of the control unit 110. At the time of image capturing, either or both of these cameras are used in accordance with an instruction from the control unit 110. At the time of automatic editing to be described later with reference to FIG. 3 and the subsequent drawings, both of the outside camera 160 and the inside camera 170 are used at the same time.

Image data obtained from image capturing performed by each of the outside camera 160 and the inside camera 170 is supplied to an image processing unit 180. The image processing unit 180 converts the image data obtained by each of the cameras 160 and 170 into data having an image size (the number of pixels) instructed by the control unit 110. The image processing unit 180 synthesizes pieces of image data obtained by the cameras 160 and 170 in response to an instruction from the control unit 110. Exemplary image synthesis processing will be described later. The image processing unit 180 performs image recognition processing for detecting the face of a person in an image in response to an instruction from the control unit 110. When performing face detection, the image processing unit 180 also performs processing for detecting the movement of a mouth. For example, the face detection and the mouth movement detection are performed in such a manner that the contour of a face and the positions and shapes of eyes, a mouth, and a nose in the face are compared with human face pattern images provided in advance.

The image processing unit 180 supplies processed image data to the memory 152 and stores it in the memory 152. Alternatively, the image processing unit 180 supplies the processed image data to the communication processing unit 102 or the near field communication processing unit 108 so as to wirelessly transmit it via the communication processing unit 102 or the near field communication processing unit 108.

[2. Process at the Time of Image Capturing]

Next, an example of a process at the time of image capturing performed with the cameras 160 and 170 included in the mobile telephone terminal device 100 will be described.

Figure 3:
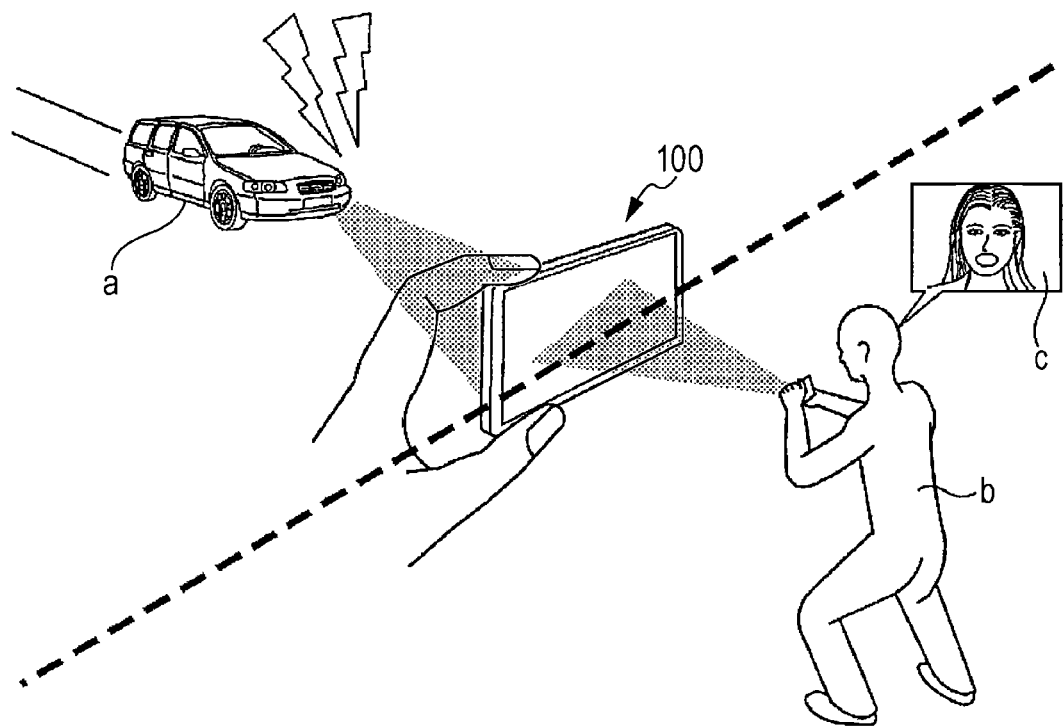
FIG. 3 is a diagram describing an example of an image capturing state according to an embodiment of the present disclosure.

FIG. 3 is a diagram illustrating an exemplary image capturing state in which the mobile telephone terminal device 100 performs image capturing. In the example illustrated in FIG. 3, a photographer b holds the mobile telephone terminal device 100 in hands thereof, points the outer surface 101a of the mobile telephone terminal device 100 at scenery a that is an image capturing target, and points the inner surface 101b of the mobile telephone terminal device 100 at the photographer b. In this state, the outside camera 160 (FIG. 1A) captures the image of the scenery a and the display panel 121 displays the captured image. The inside camera 170 (FIG. 1B) captures the image of a face c of the photographer b.

The image processing unit 180 in the mobile telephone terminal device 100 performs face recognition processing on the basis of the captured image of the face c of the photographer b, and the control unit 110 determines whether the mouth of the photographer b has moved. The sound separation processing unit 103a separates sound transmitted from the position of the photographer b from sound obtained by the two microphones 105 and 106, and the control unit 110 determines whether there is sound from the position, that is, the voice of the photographer b.

On the basis of results of the determination of whether there is voice of the photographer b and the determination of whether the mouth of the photographer b has moved, the image processing unit 180 automatically performs image editing processing for combining the image of the photographer captured by the inside camera 170 with the image captured by the outside camera 160 under the control of the control unit 110. The processing for combining the image of the photographer with the image captured by the outside camera 160 is performed when a photographer display mode is set. When an avatar display mode to be described later is set, the image processing unit 180 uses an avatar image stored in advance for image synthesis instead of the image of the photographer. For example, a photographer sets one of the photographer display mode and the avatar display mode and setting data is stored in the memory 152.

Next, an automatic image editing process at the time of image capturing performed in the state illustrated in FIG. 3 will be described with reference to a flowchart illustrated in FIG. 4.

First, the control unit 110 detects sound transmitted from a photographer which has been separated by the sound separation processing unit 103a, and detects the movement of a mouth of the photographer with the image processing unit 180 (step S1). The control unit 110 determines whether sound from a corresponding sound source position (the voice of the photographer) has been detected from the sound separated by the sound separation processing unit 103a (step S2). For example, when the sound transmitted from the corresponding sound source position has a level equal to or higher than a threshold value, it is determined that the voice of the photographer has been detected. In a case where it is determined in step S2 that sound that is output from the corresponding sound source position and has the level equal to or higher than the threshold value has not been detected, the process returns to step S1 in which the control unit 110 performs detection processing.

In a case where it is determined in step S2 that sound corresponding to the voice of the photographer has been detected, the control unit 110 determines whether the mouth of the photographer has been opened on the basis of a result of image recognition performed by the image processing unit 180 (step S3). In a case where it is determined in step S3 that the mouth of the photographer has not been opened, the process returns to step S1 in which the control unit 110 performs detection processing.

In a case where it is determined in step S3 that the mouth of the photographer has been opened, the control unit 110 determines which of image synthesis modes, a photographer display mode and an avatar display mode, is set (step S4). A process performed in a case where it is determined that the avatar display mode is set will be described later with reference to a flowchart illustrated in FIG. 5.

In a case where it is determined that the photographer display mode is set, the image processing unit 180 performs Picture-in-Picture processing for combining an image captured by the inside camera 170 with an image captured by the outside camera 160 under the control of the control unit 110 (step S5). After the synthesis processing has been performed, a synthesized image is set as an image to be displayed by the display unit 120. In addition, the synthesized image is set as an image to be stored in the memory 152 and externally transmitted. As sound to be stored and transmitted along with the image, for example, sound obtained by synthesizing sounds collected by the two microphones 105 and 106 is set.

After the image synthesis processing has been started in step S5, the control unit 110 detects sound transmitted from the photographer which has been separated by the sound separation processing unit 103a, and detects the movement of the mouth of the photographer with the image processing unit 180 (step S6). The control unit 110 determines whether no voice of the photographer having a level equal to or higher than the threshold value has been detected from the sound separated by the sound separation processing unit 103a over a predetermined period (step S7). A period over which no voice having a level equal to or higher than the threshold value has been detected is shorter than the predetermined period, the process returns to step S6 in which the detection processing is performed.

In a case where it is determined in step S7 that no voice having a level equal to or higher than the threshold value has been detected over the predetermined period, the control unit 110 determines whether image synthesis processing continuation request has been made by a user's operation (step S8). In a case where the image synthesis processing continuation request has been made, the process returns to step S6 in which the detection processing is performed.

In a case where it is determined in step S8 that the image synthesis processing continuation request has not been made, the control unit 110 ends the synthesis processing performed by the image processing unit 180 with an image captured by the inside camera 170, and sets only the image captured by the outside camera 160 as a display image (step S9). Accordingly, an image to be displayed by the display unit 120 is changed from the synthesized image to the image captured by the outside camera 160. An image to be stored in the memory 152 and externally transmitted is also changed from the synthesized image to the image captured by the outside camera 160.

After the synthesis processing has ended in step S9, the process returns to step S1.

Next, the process performed in a case where it is determined in step S4 that the avatar display mode is set will be described with reference to the flowchart illustrated in FIG. 5.

First, in a case where it is determined in step S4 (FIG. 4) that the avatar display mode is set, the image processing unit 180 detects a face from the image captured by the inside camera 170 (step S21). The control unit 110 determines whether the movement of the mouth of the photographer has been detected by the face detection (step S22). In a case where it is determined in step S22 that the movement of the mouth has not been detected, the process returns to step S21.

It is determined that the movement of the mouth of the photographer has been detected by the face detection, the image processing unit 180 performs image synthesis processing for combining an avatar image with the image captured by the outside camera 160 under the control of the control unit 110 (step S23). After the image synthesis processing has been performed, a synthesized image is set as an image to be displayed by the display unit 120. In addition, the synthesized image is set as an image to be stored in the memory 152 and externally transmitted.

After the synthesis processing has been started in step S23, the control unit 110 determines whether a predetermined period has elapsed from the start of the image synthesis processing (step S24). In a case where the control unit 110 determines that the predetermined period has not elapsed, the determination processing in step S24 is repeated.

In a case where it is determined in step S24 that the predetermined period has elapsed, the control unit 110 determines whether image synthesis processing end request has been made by a user's operation (step S25). In a case where the image synthesis processing end request has not been made, the process returns to step S21 in which the detection processing is performed.

In a case where it is determined in step S25 that the end request has been made, the control unit 110 ends the synthesis processing performed by the image processing unit 180 with an avatar image, and sets only the image captured by the outside camera 160 as a display image (step S26). Accordingly, an image to be displayed by the display unit 120 is changed from the synthesized image to the image captured by the outside camera 160. An image to be stored in the memory 152 and externally transmitted is also changed from the synthesized image to the image captured by the outside camera 160.

Figure 4:
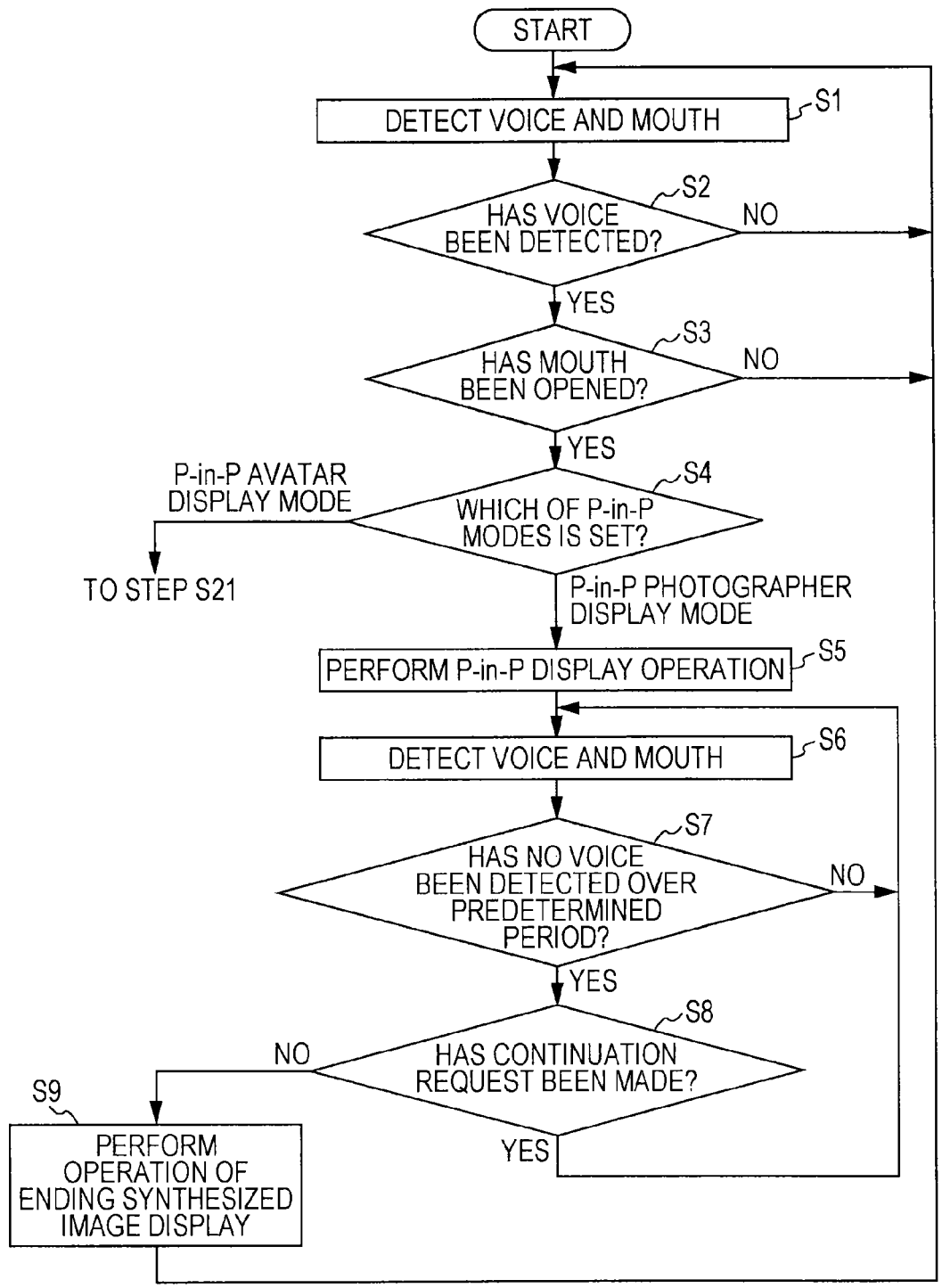
FIG. 4 is a flowchart illustrating an example of an automatic editing process according to an embodiment of the present disclosure.

After the synthesis processing has ended in step S26, the process returns to step S1 (FIG. 4).

Next, the execution status of the image synthesis processing illustrated in the flowcharts in FIGS. 4 and 5 will be described.

First, a state in which the sound separation processing unit 103a extracts sound transmitted from a specific sound source position from sounds collected by the microphones 105 and 106 is illustrated in FIG. 6. FIG. 6 illustrates the relationship between a frequency and a sound level at a certain time.

Figure 6A:
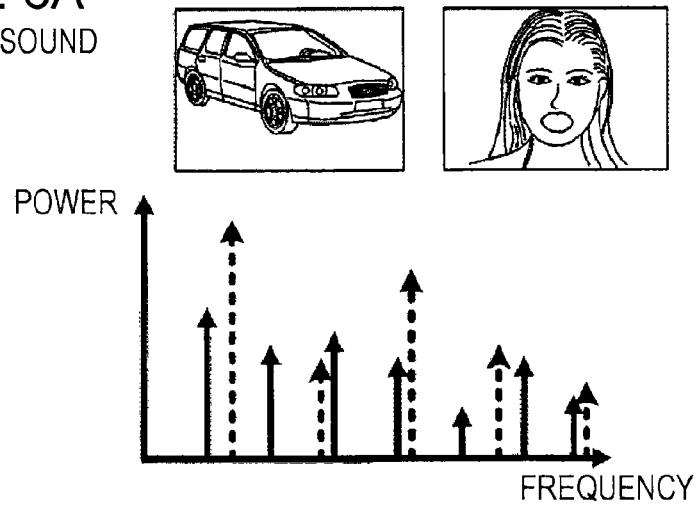
FIG. 6A, FIG. 6B and FIG. 6C are diagrams describing an example of sound separation processing according to an embodiment of the present disclosure.
Figure 6B:
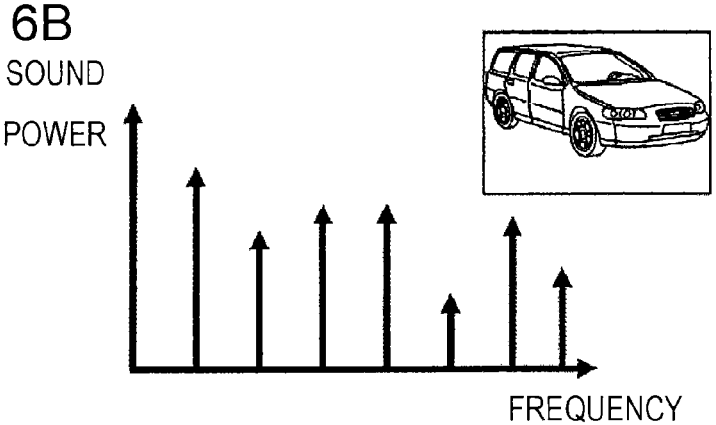
Figure 6C:
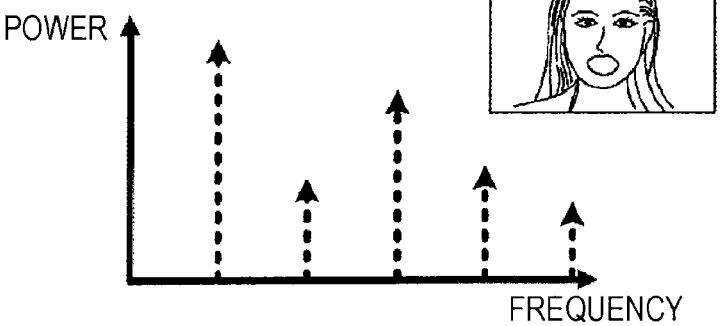

In the mobile telephone terminal device 100, the microphone 105 is disposed on the outer surface 101a and the microphone 106 is disposed on the inner surface 101b. Accordingly, as illustrated in FIG. 6A, by mixing sounds collected by the two microphones 105 and 106, sound including the mixture of sound from an image capturing area of the outside camera 160 and the voice of the photographer is obtained. For example, sound output from the microphone 106 disposed on the inner surface 101b includes not only a relatively large amount of voice component of the photographer but also ambient sound. Sound output from the microphone 105 disposed on the outer surface 101a also includes the voice component of the photographer.

The sound separation processing unit 103a therefore analyzes sound signals supplied from the microphones 105 and 106. On the basis of a result of the analysis, the sound separation processing unit 103a separates a sound component (FIG. 6B) from a sound source position in the image capturing area of the outside camera 160 and a sound component (FIG. 6C) from a sound source position in the image capturing area of the inside camera 170 from each other.

The sound separation processing unit 103a detects the sound component (FIG. 6C) from a sound source position in the image capturing area of the inside camera 170 as the voice of the photographer. The control unit 110 controls image synthesis processing in accordance with the presence of the voice.

In a photographer sound erasure mode to be described later in a modification, a sound component from a sound source position in the image capturing area of the inside camera 170 is extracted by the sound separation processing unit 103*a* and is erased from mixed sound.

FIG. 7 is a sequence diagram illustrating the start of synthesis processing at the time of image capturing.

Figure 7A:
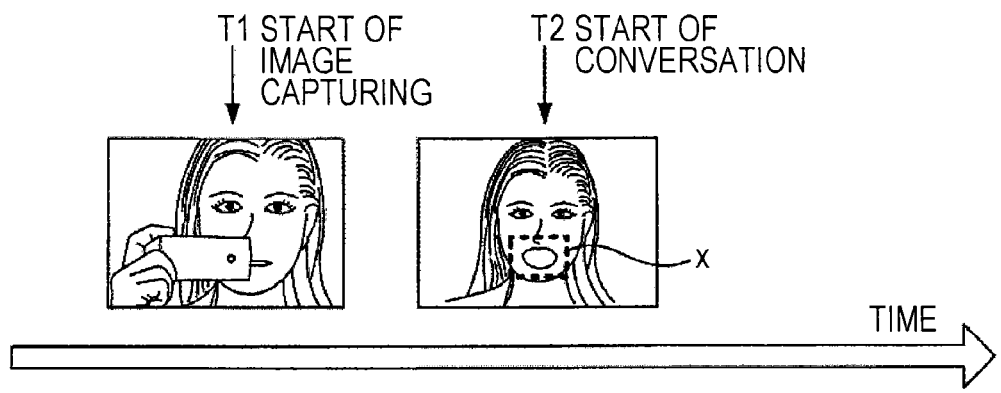
FIG. 7A and FIG. 7B are diagrams illustrating an example of an image editing state according to an embodiment of the present disclosure.
Figure 7B:
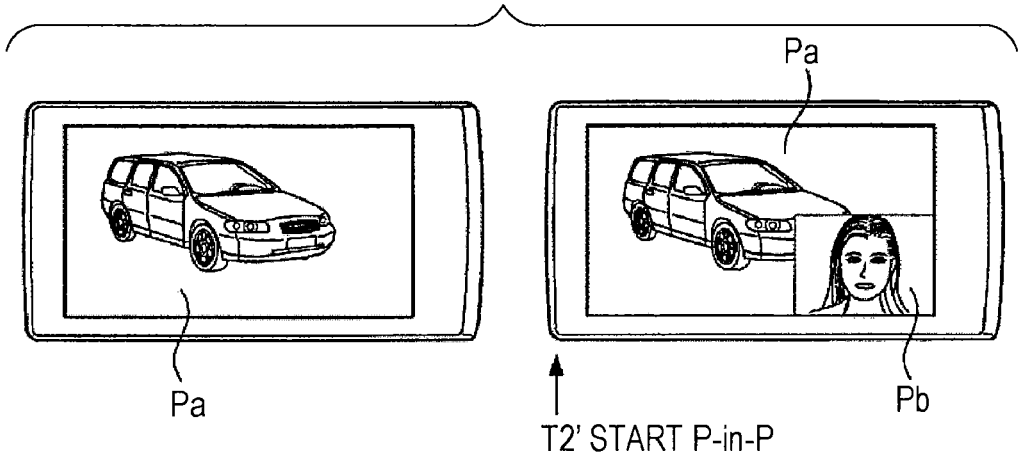

As illustrated in FIG. 7A, at a time T1, a photographer starts image capturing with the outside camera 160. At that time, as illustrated in FIG. 7B, an image Pa captured by the outside camera 160 is displayed. At a time T2, the photographer opens a mouth x and starts conversation. At that time, the opening (movement) of the mouth x is detected from an image captured by the inside camera 170 and the voice of the photographer is detected from sound transmitted from the position of the photographer. At a time T2' that is substantially the same as the time T2, Picture-in-Picture processing for placing a photographer image Pb captured by the inside camera 170 at a right-hand corner of the image Pa captured by the outside camera 160 is started.

Thus, as soon as the photographer starts conversation, the image of the photographer is automatically combined with an image of scenery around the photographer. Accordingly, the image of the photographer can be displayed for only a required period without causing the photographer to perform a start operation and an end operation with operation keys. As a result, an image in which the photographer is talking about surroundings can be automatically created.

[3. Example of Avatar Display Processing]

Figure 5:
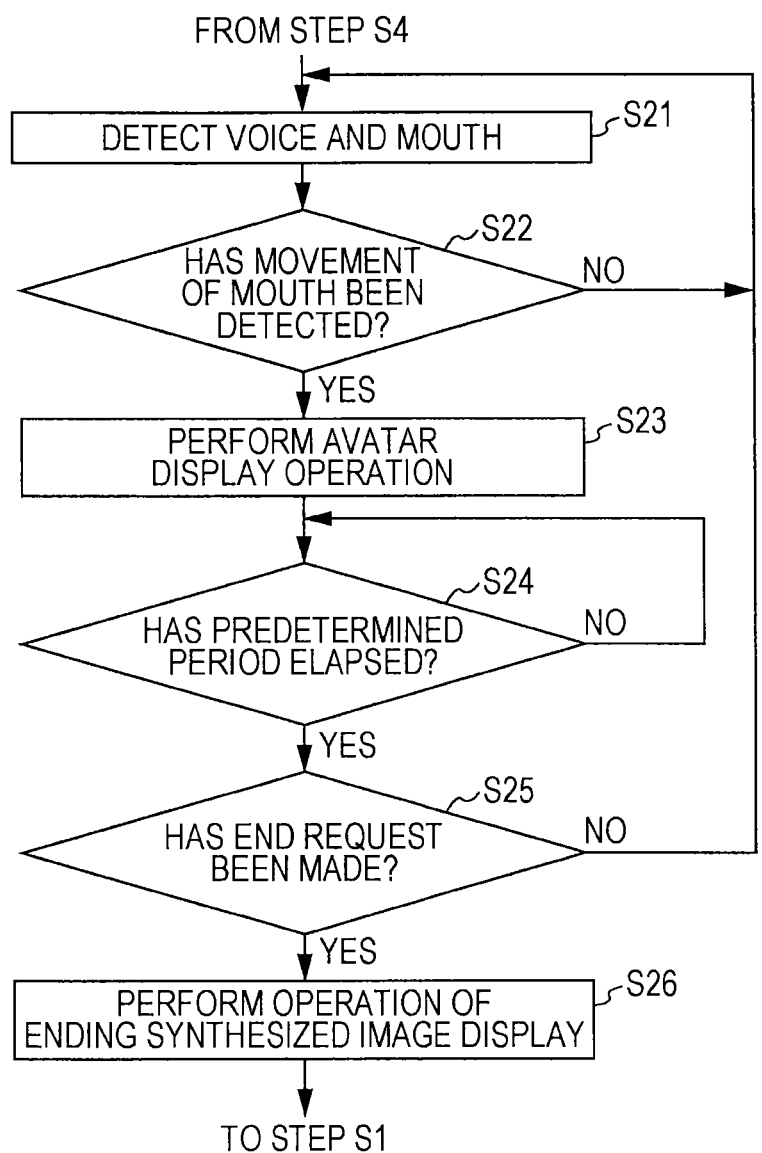
FIG. 5 is a flowchart illustrating an example of an avatar display process at the time of the automatic editing process according to an embodiment of the present disclosure.

Next, an exemplary case in which the avatar display mode illustrated in the flowchart in FIG. 5 is set will be described with reference to FIG. 8.

Figure 8A:
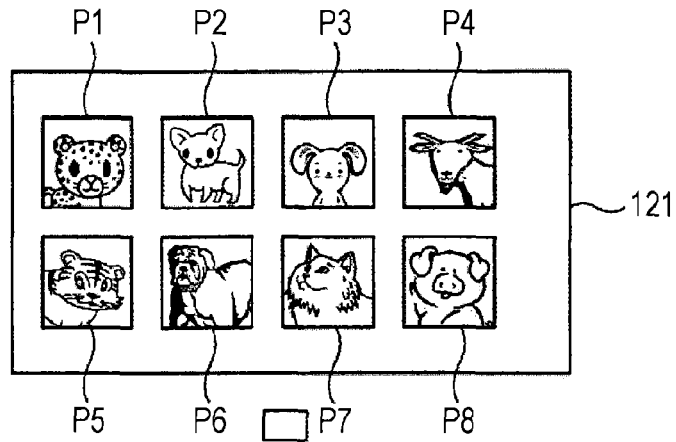
FIG. 8A, FIG. 8B and FIG. 8C are diagrams illustrating an example of avatar display processing according to an embodiment of the present disclosure.

In the avatar display mode, it is necessary to select an avatar image to be displayed at the time of image synthesis. For the selection of an avatar image, for example, as illustrated in FIG. 8A, avatar images are listed on the display panel 121 under the control of the control unit 110. Referring to FIG. 8A, eight avatar images P1 to P8 are displayed. As an avatar image, any image can be used. For example, various face images such as the image of an animal face and the image of an animation character can be used. A user may set an image captured from outside as an avatar image.

After a user has selected a specific avatar image on the display screen illustrated in FIG. 8A, the selected avatar image is determined as a synthesis target image in the avatar display mode.

Figure 8B:
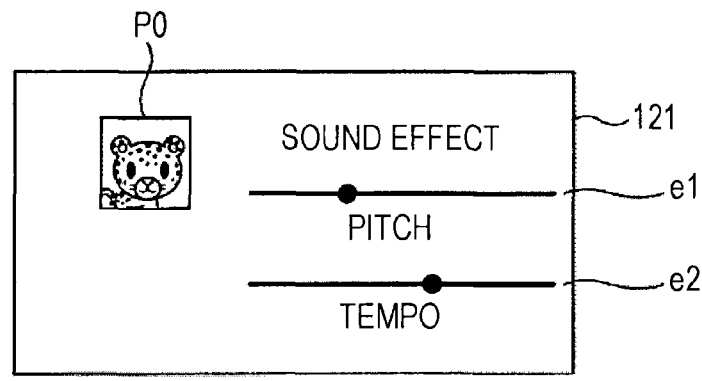

In the avatar display mode, effect processing may be performed on sound from a photographer whose avatar image is being subjected to synthesis. For example, as illustrated in FIG. 8B, the display panel 121 displays an avatar image P0 that has been selected and a setting display screen for effect processing to be performed on sound from the position of a photographer. In this example, a display screen for adjustment of sound pitch and sound tempo is displayed.

In a case where a user performs the setting of sound effect processing with the display screen illustrated in FIG. 8B, the set sound effect processing is performed on sound from a photographer at the time of the image synthesis performed with an avatar image in step S23 in the flowchart illustrated in FIG. 5.

Figure 8C:
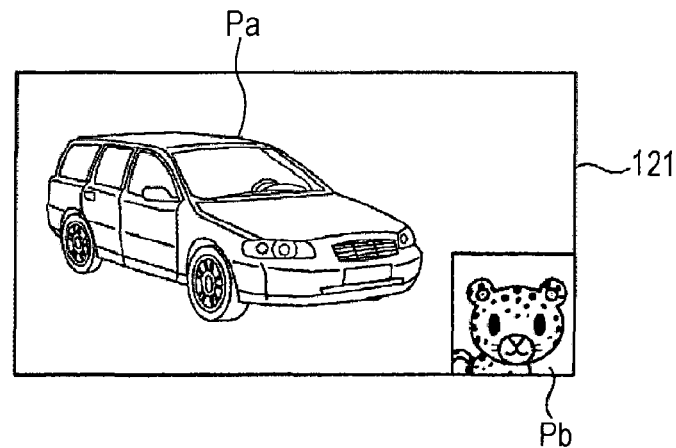

FIG. 8C is a diagram illustrating exemplary image synthesis performed with an avatar image in step S23 in the flowchart illustrated in FIG. 5. As illustrated in FIG. 8C, a synthesized image obtained by combining an avatar image Pb with the image Pa captured by the outside camera 160 is displayed on the display panel 121. The image that has been subjected to synthesis processing is set as an image to be stored and externally transmitted.

By performing synthesis processing in the avatar display mode, it is possible to automatically create an image in which a photographer is talking about surroundings while allowing the photographer to remain anonymous. By performing sound effect processing in the avatar display mode, it is also possible to achieve the hiding of sound of the photographer.

At the time of combining an avatar image with the image captured by the outside camera 160 in the avatar display mode, the mouth of a face included in the avatar image may be moved in synchronization with the detected movement of the mouth of a photographer in the image captured by the inside camera 170. As a result, the effect of displaying the avatar image as if the face in the avatar image talks can be obtained.

[4. Modification]

Referring to FIGS. 7 and 8, image synthesis is performed in such a manner that the reduced image of a photographer or an avatar image is placed on a part of the image captured by the outside camera 160. In a case where two images are displayed at the same time on the basis of a result of detection of photographer's voice, the image captured by the outside camera 160 and the image captured by the inside camera 170 may be displayed side by side or one above the other.

Figure 9A:
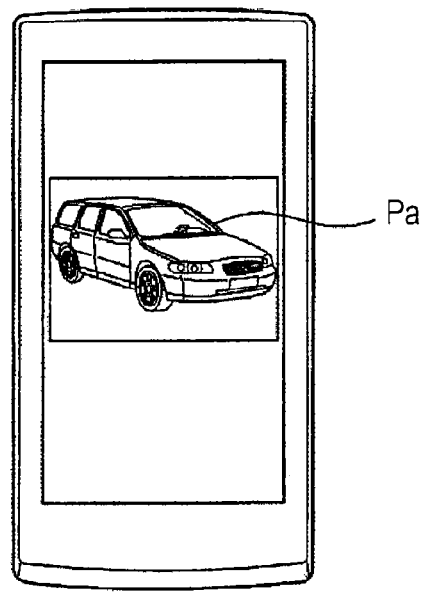
FIG. 9A and FIG. 9B. are diagrams illustrating a display example according to another embodiment of the present disclosure.
Figure 9B:
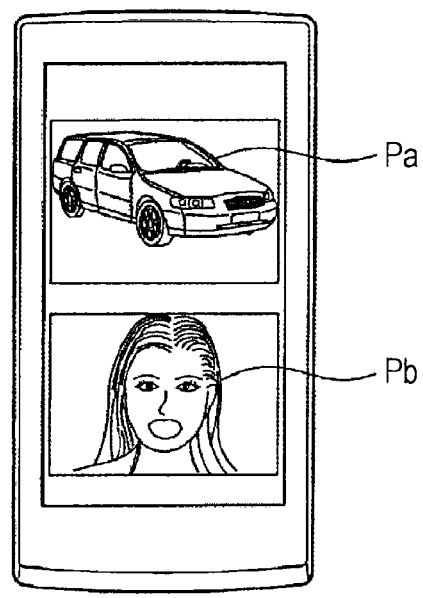
Figure 10:
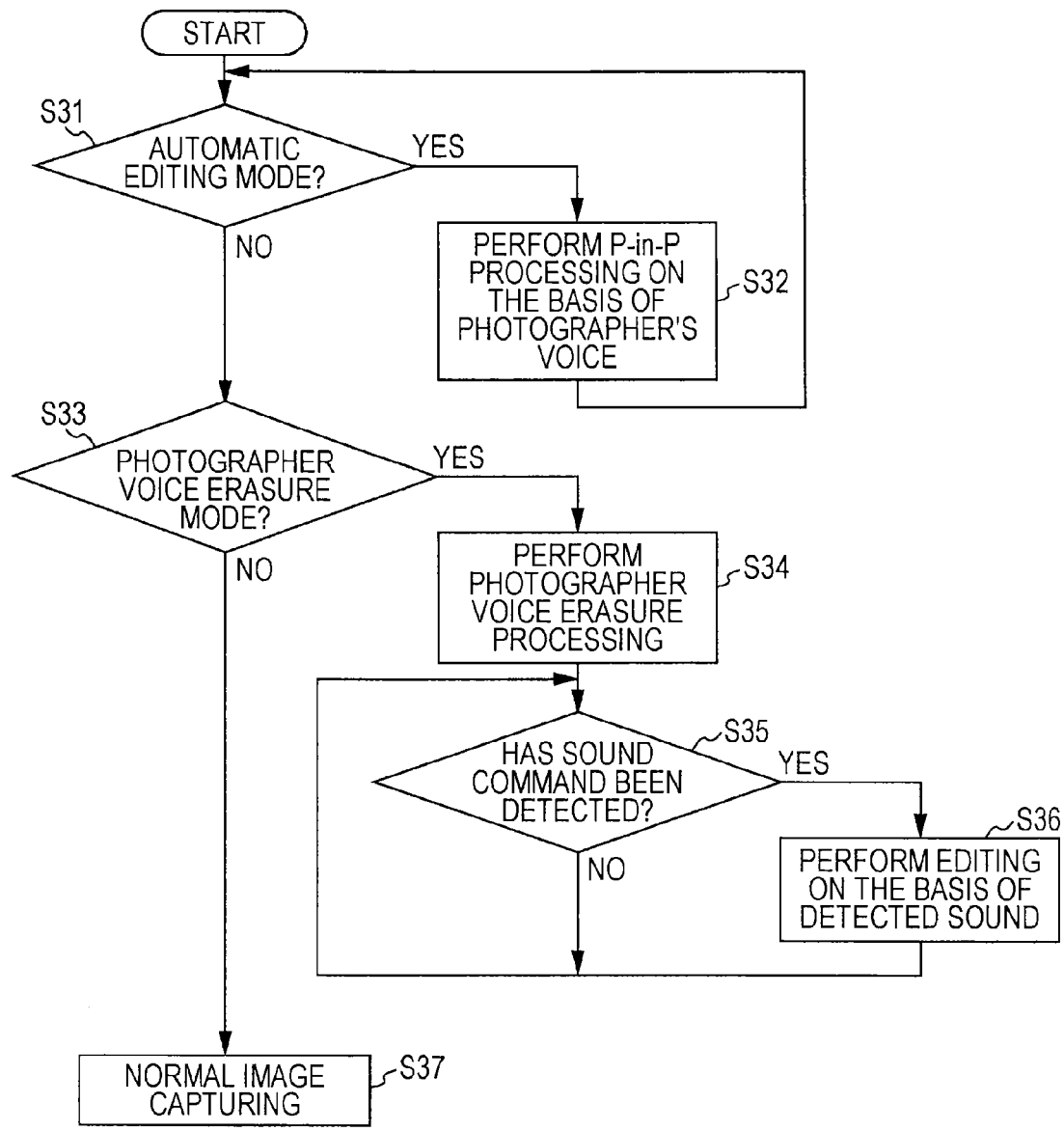
FIG. 10 is a flowchart illustrating an example of a mode switching process according to still another embodiment of the present disclosure.

For example, in a case where the synthesis processing is not performed, only the image Pa captured by the outside camera 160 is displayed as illustrated in FIG. 9A. In a case where the synthesis processing is performed, the image Pa captured by the outside camera 160 and the image Pb captured by the inside camera 170 are displayed one above the other as illustrated in FIG. 9B. Referring to FIG. 9B, two images are vertically displayed one above the other. These images may be horizontally displayed side by side.

Referring to the flowchart illustrated in FIG. 4, the image synthesis processing is started on the basis of a result of detection of photographer's voice and a result of detection of the movement of a photographer's mouth. The image synthesis processing may be started on the basis of one of these detection results. For example, the image synthesis processing may be started when it is detected that sound having a predetermined level is transmitted from the position of a photographer. Alternatively, the image synthesis processing may be started when the movement of the mouth of the photographer is detected from an image.

The case in which the image synthesis processing is performed on the basis of the voice of a photographer has been described. A user may change an image capturing mode in which the image synthesis is performed to another image capturing mode as appropriate.

FIG. 10 is a flowchart illustrating an exemplary process of setting an image capturing mode in the mobile telephone terminal device 100.

First, the control unit 110 determines whether an image capturing mode set for the mobile telephone terminal device 100 is an automatic editing mode (step S31). The automatic editing mode is a mode in which image synthesis is automatically performed with the image of a photographer or an avatar image on the basis of a result of detection of photographer's voice which has been described with reference to the flowcharts in FIGS. 4 and 5.

In a case where the control unit 110 determines that the automatic editing mode is set, image synthesis processing is performed on the basis of the voice of a photographer (step S32).

In a case where it is determined in step S31 that the automatic editing mode is not set, the control unit 110 determines whether a photographer sound erasure mode is set (step S33).

In the photographer sound erasure mode, after the sound separation processing unit 103a has extracted a sound component transmitted from the image capturing area of the inside camera 170, the extracted sound component is erased from mixed sound (step S34). Sound including no voice of the photographer is used as sound to be stored and externally transmitted.

In addition, in the photographer sound erasure mode, an operation instruction can be made with the voice of a photographer. That is, the control unit 110 determines whether a sound command stored in advance has been detected from the sound component transmitted from the image capturing area of the inside camera 170 (step S35). When it is determined that the sound command has been detected, the control unit 110 performs the editing of an image or sound in response to the detected sound command (step S36). Subsequently, the process returns to step S35 in which the detection processing is performed. For example, phrases of "start BGM" and "superimposition" representing editing operation instructions are stored as sound commands, and an editing operation corresponding to a phrase detected from sound is performed.

In a case where it is determined in step S33 that the photographer sound erasure mode is not set, image capturing is performed in a normal mode in which the image synthesis processing and the sound erasure processing are not performed (step S37).

Since there are a plurality of image capturing modes as described previously, it is possible to respond to various image capturing conditions.

In the above-described embodiment, the process at the time of image capturing performed with cameras in a mobile telephone terminal device has been described. Various terminal devices each including cameras may perform a similar process. A similar process may be performed in such a manner that software (a program) for causing a computer to perform the image capturing method described in the above-described exemplary embodiment is created and is installed into an existing terminal device. For example, the software is stored in a medium and is distributed to the terminal device.

The configuration and processing described in Claims of the present disclosure are not limited to the above-described exemplary embodiment. It is obvious to those skilled in the art that various changes, various combinations, other embodiments can be made in consideration of design or another factor insofar as they are within the scope of the present disclosure as claimed or the equivalents thereof.

REFERENCE SIGNS LIST

- 100: mobile telephone terminal device
- 101a: outer surface
- 101b: inner surface
- 101: antenna
- 102: communication processing unit
- 103: sound processing unit
- 103a: sound separation processing unit
- 104: speaker
- 105, 106: microphone
- 107: antenna
- 108: near field communication processing unit
- 109: sensor unit
- 110: control unit
- 120: display unit
- 121: display panel
- 130: touch panel unit
- 140: operation key
- 151, 152: memory
- 160: outside camera
- 170: inside camera
- 180: image processing unit

What is claimed is:

1. A terminal apparatus comprising:
a display that is disposed on a case and is configured to display an image;
a first camera disposed on a surface on which the display performs image display;
a second camera disposed on a surface opposite the surface on which the first camera is disposed;
a plurality of microphones disposed on the case; and
processing circuitry configured to
control detection of sound transmitted from a sound source on a side of the first camera with sound signals obtained by at least one of the plurality of microphones, and
automatically combine a first image which is captured by the first camera with a second image captured by the second camera on the basis of a result of the detection of sound transmitted from the sound source on the side of the first camera having a level equal to or higher than a threshold value,
wherein the first image and the second image are each moving images, and the processing circuitry automatically combines the first image and the second image while the moving images for the first image and the second image are being captured by the first camera and the second camera respectively,
the processing circuitry being further configured to determine whether a mouth of a user facing a side of the first camera has moved and to determine if there is a sound from the user obtained by at least one of the plurality of microphones, and automatically combine the first image with the second image when the processing circuitry determines that there is a sound from the user obtained by at least one of the plurality of microphones and that the mouth of the user has moved, and
when there is no detection of sound transmitted from the sound source on the side of the first camera by the processing circuitry, the second image is displayed on the display without the first image.

2. The terminal apparatus according to claim 1, the processing circuitry being further configured to perform face recognition processing on the basis of a captured image of a face of a user facing a side of the first camera.

3. The terminal apparatus according to claim 1, wherein the first image is combined with the second image such that the first image has a smaller size than the second image and the first image overlaps a portion of the second image.

4. The terminal apparatus according to claim 1, wherein the first image is combined with the second image such that the first image is displayed adjacent to the second image.

5. The terminal apparatus according to claim 1, wherein the processing circuitry is configured to perform sound effect processing on the sound source on the side of the first camera.

6. The terminal apparatus according to claim 5, wherein the sound effect processing is based on at least one of pitch and tempo settings set in advance.

7. A method implemented by a terminal apparatus that includes a display that is disposed on a case and is configured to display an image, a first camera disposed on a surface on which the display performs image display, a second camera disposed on a surface opposite the surface on which the first camera is disposed, and a plurality of microphones disposed on the case, the method comprising:

detecting, by processing circuitry, sound transmitted from a sound source on a side of the first camera with sound signals obtained by at least one of the plurality of microphones; and automatically combining, by the processing circuitry, a first image which is captured by the first camera with a second image captured by the second camera on the basis of a result of the detection of sound transmitted from the sound source on the side of the first camera, wherein the first image and the second image are each moving images, and the processing circuitry automatically combines the first image and the second image while the moving images for the first image and the second image are being captured by the first camera and the second camera respectively, the method further including determining whether a mouth of a user facing a side of the first camera has moved and determining if there is a sound from the user obtained by at least one of the plurality of microphones, and automatically combining the first image with the second image when it is determined that there is a sound from the user obtained by at least one of the plurality of microphones and that the mouth of the user has moved, and when there is no detection of sound transmitted from the sound source on the side of the first camera, the second image is displayed on the display without the first image.

8. A non-transitory computer readable storage medium storing a program that when executed by a terminal apparatus that includes a display that is disposed on a case and is configured to display an image, a first camera disposed on a surface on which the display performs image display, a second camera disposed on a surface opposite the surface on which the first camera is disposed, a plurality of microphones disposed on the case, and processing circuitry, causes the terminal apparatus to perform a method comprising:

detecting sound transmitted from a sound source on a side of the first camera with sound signals obtained by at least one of the plurality of microphones; and automatically combining a first image which is captured by the first camera with a second image captured by the second camera on the basis of a result of the detection of sound transmitted from the sound source on the side of the first camera having a level equal to or higher than a threshold value, wherein the first image and the second image are each moving images, and the processing circuitry automatically combines the first image and the second image while the moving images for the first image and the second image are being captured by the first camera and the second camera respectively, the method further including determining whether a mouth of a user facing a side of the first camera has moved and determining if there is a sound from the user obtained by at least one of the plurality of microphones, and automatically combining the first image with the second image when it is determined that there is a sound from the user obtained by at least one of the plurality of microphones and that the mouth of the user has moved, and when there is no detection of sound transmitted from the sound source on the side of the first camera, the second image is displayed on the display without the first image.

\* \* \* \* \*